United States Patent [19]

Hyman

[11] Patent Number: 5,055,053
[45] Date of Patent: Oct. 8, 1991

[54] COMPUTER TOY

[76] Inventor: Greg Hyman, 377 Cross Pond Rd., Rte. 2, Pound Ridge, N.Y. 10576

[21] Appl. No.: 406,729

[22] Filed: Sep. 13, 1989

[51] Int. Cl.$^5$ .............................................. G09B 7/00
[52] U.S. Cl. .................................... 434/343; 434/169; 434/201; 434/322; 434/327; 434/335; 273/455
[58] Field of Search ............... 434/159, 167, 169, 170, 434/175, 176, 198, 199, 201, 202, 207, 307, 315, 316, 322, 323, 327, 334, 335, 339, 340, 343, 345, 379, 405; 27/1 E, 1 GC

[56] References Cited

U.S. PATENT DOCUMENTS

| 3,508,349 | 4/1970 | Gilden et al. | 434/169 X |
| 3,708,893 | 1/1973 | Murphy | 434/343 |
| 4,027,402 | 6/1977 | Liu et al. | 434/343 |
| 4,280,809 | 7/1981 | Greenberg et al. | 434/343 |
| 4,358,278 | 11/1982 | Goldfarb | 434/169 X |
| 4,439,757 | 3/1984 | Gross et al. | 434/176 X |
| 4,573,928 | 3/1986 | Seki | 434/176 |
| 4,729,564 | 3/1988 | Kuna et al. | 434/335 X |

FOREIGN PATENT DOCUMENTS 2127986 7/1981 Fed. Rep. of Germany ...... 434/201

*Primary Examiner*—Richard J. Apley
*Assistant Examiner*—Joe H. Cheng

*Attorney, Agent, or Firm*—Darby & Darby

[57] ABSTRACT

Computer toy to demonstrate logical relationships, e.g. to a child, having a personal computer-like housing, a display system displaying a plurality of first and second type symbols, each first type symbol being logically related to one among the second type symbols to form a related pair, a plurality of housing positions corresponding to the symbols and each adjacent a respective symbol, an input system to select a particular housing position and indicate its selection and its adjacent symbol as one of a pair to be formed by such selecting, a circuit detecting whether a first and a second type symbol have been properly paired to form a related pair upon selecting by the input system a housing position adjacent a first type symbol and a housing position adjacent a second type symbol, and an output system issuing one signal if a related pair has been formed and a different signal if not so formed, and particularly such that where the circuit detects that all the related pairs have been successfully formed from among the symbols, the output system issues a still different third signal. The toy has an indicator indicating a program mode correlating the circuit and display system for forming the related pairs, and a control to program the circuit to that mode.

14 Claims, 3 Drawing Sheets

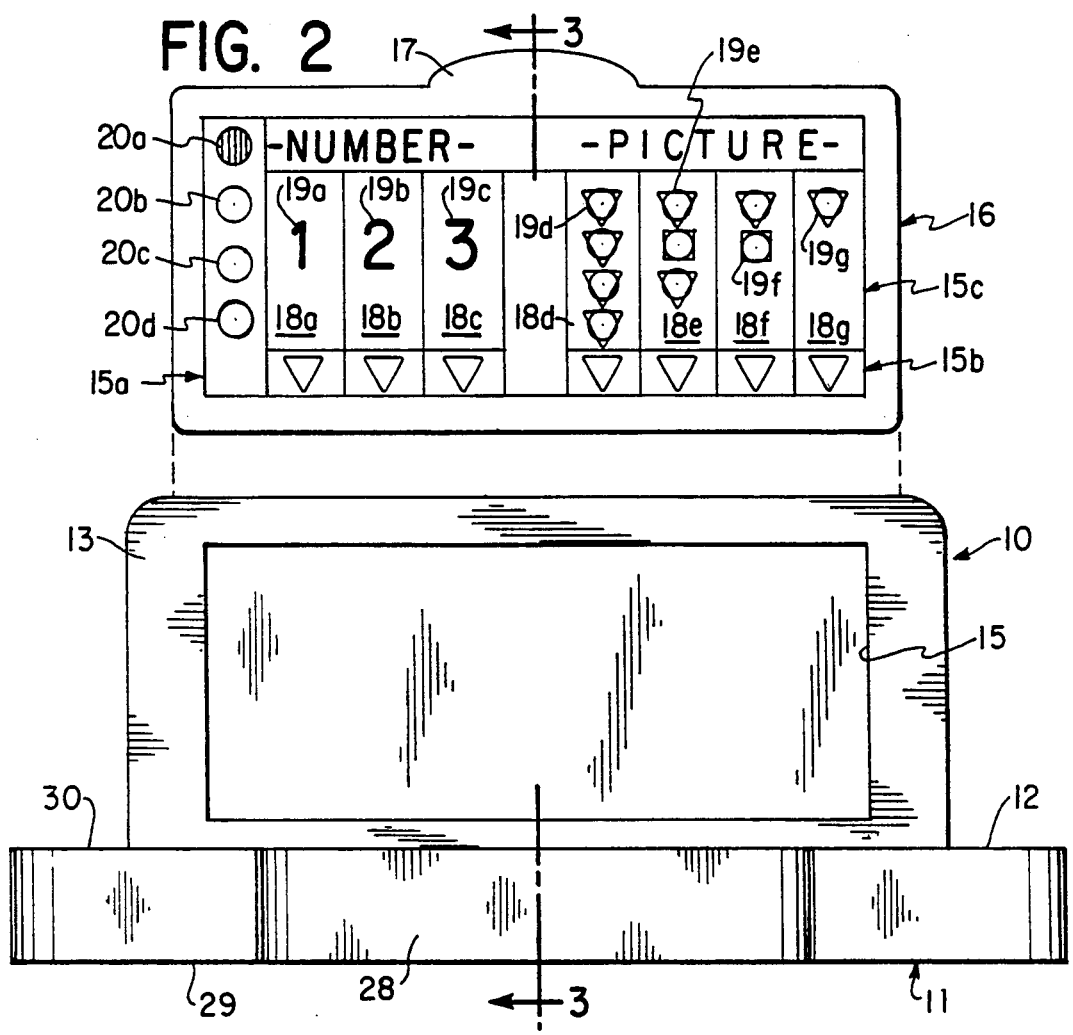
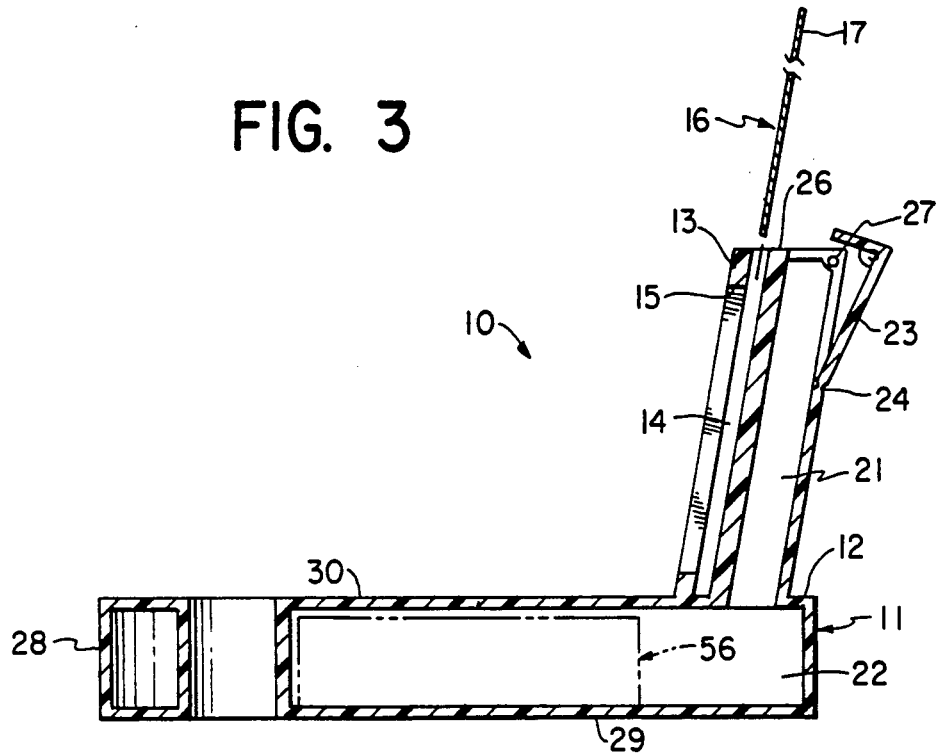

COMPUTER TOY

FIELD AND BACKGROUND OF THE INVENTION

The present invention relates to a computer toy, and more particularly to such a toy for use in demonstrating associated logical relationships, especially to a child.

The ability to associate logically related symbols is an important skill learned during childhood development. Many educational toys, games and other devices have been provided heretofore to assist in developing this ability.

U.S. Pat. No. 4,280,809 to Greenberg et al shows one such educational toy, in which first and second members on a housing are movable relative to first and second sets of symbols, respectively, such that in use the child moves the first member to a symbol in the first set and the second member to a symbol in the second set, and then manually actuates a switch to see if the two selected symbols are logically related. If so, a first signal issues indicating correct performance, and if not, a second signal issues indicating incorrect performance.

U.S. Pat. No. 3,795,989 to Greenberg et al shows an educational device having a plurality of different positions, each associated with a specific musical tone, which is used with an answer card having logical symbols in corresponding positions, such that on inserting the answer card in the device to answer questions on a separate question card by touching the answers at positions on the answer card in the order of the questions arranged on the question card, a recognizable melody is played.

These known devices are not effective for introducing a child in a practical and rudimentary way to the concept of computing, a concept of increasing importance even to young children, nor do they provide for linear left to right operation, which is the natural order in which a child must look at pertinent printed material and will eventually learn to read.

SUMMARY OF THE INVENTION

It is among the objects of this invention to provide a toy which is effective for introducing a child in a practical and rudimentary way to the concept of computing, such as is embodied in a personal computer, for training the child in using linear left to right operations, as carried out with computers, and thereby familiarize the child with similar operations as in ordinary reading, and in general for demonstrating logical relationships, especially to a child.

It is among the additional objects of this invention to provide a computer toy which is simple, inexpensive and relatively small in construction and robust and serviceable in use, which is composed of conventional materials and circuit components, minimum in number, and which can be hand carried and easily operated even by a small child.

According to this invention, a computer toy for demonstrating logical relationships, such as to a child, is advantageously provided, comprising a housing shaped to resemble a personal computer and having a base portion and a viewing portion arranged to extend upwardly from the base portion.

Display means are arranged on the viewing portion to display a plurality of first type symbols and a plurality of second type symbols in an array, each first type symbol being logically related to one among the second type symbols to form a related pair, and a plurality of housing positions is arranged on the housing, e.g. on the base portion, in an array corresponding to the array of symbols such that each housing position is adjacent a respective symbol.

The toy has input means to select a particular housing position and to indicate its selection and thereby its adjacent symbol as one of a pair to be formed by such selecting, a logic circuit to detect whether a first type symbol has been properly paired with a second type symbol to form a related pair upon selecting, e.g. in sequence, by the input means a housing position adjacent a first type symbol and a housing position adjacent a second type symbol, and output means to issue a first signal if a related pair has been formed and a different second signal if not so formed.

Indicator means are used to indicate a program mode correlating the circuit and display means for forming such related pairs, and control means to program the circuit to that mode.

Specifically, the display means may include an interchangeable panel removably arranged on the viewing portion and containing the symbols thereon, and the indicator means may include code means on the panel. Conveniently, the viewing portion may have a window slot for removably inserting the panel therein, and the housing may have a compartment for storing a plurality of such panels, each with a symbol array corresponding to a different program mode.

The control means may include a plurality of mode switches, e.g. including finger operated keypads on the base portion, connected to program the circuit to different modes.

The input means may include position switches, e.g. including finger operated keypads on the base portion, and associated light emitting means corresponding to the housing positions and connected to the circuit to energize the light emitting means associated with a particular housing position upon actuating a position switch corresponding to that housing position.

The light emitting means are preferably connected to the circuit to energize the particular light emitting means indicating the selected first type symbol and the particular light emitting means indicating the correct second type symbol forming the related pair therewith when a correct pairing of symbols has occurred, and further to energize the particular light emitting means indicating the correct second type symbol forming the related pair with the selected first type symbol when an incorrect pairing of symbols has occurred.

The output means may include a sound generator in the circuit to generate one kind of sound as the first signal and a different kind of sound as the second signal.

Desirably, the circuit is also arranged to detect whether cumulatively all the related pairs have been successfully formed from among the plurality of symbols, and the output means is arranged to issue a still different third signal, such as a still different kind of sound by the sound generator, if the correct pairing of all related symbols has occurred. Favorably, light emitting means are provided which are connected to the circuit for energizing when the third signal is issued, such as the light emitting means of the input means associated with the housing positions, whereby they may all be energized substantially simultaneously when the correct pairing of all related symbols has occurred and the third signal is issued.

BRIEF DESCRIPTION OF THE DRAWINGS

Other objects of the invention will become apparent from the within specification and accompanying drawings, in which:

FIG. 2 is a schematic front view of the two main separate parts of the toy of FIG. 1;

FIG. 3 is a sectional view taken along line 3—3 of FIG. 2; and

DESCRIPTION OF THE PREFERRED EMBODIMENTS

Figure 1:
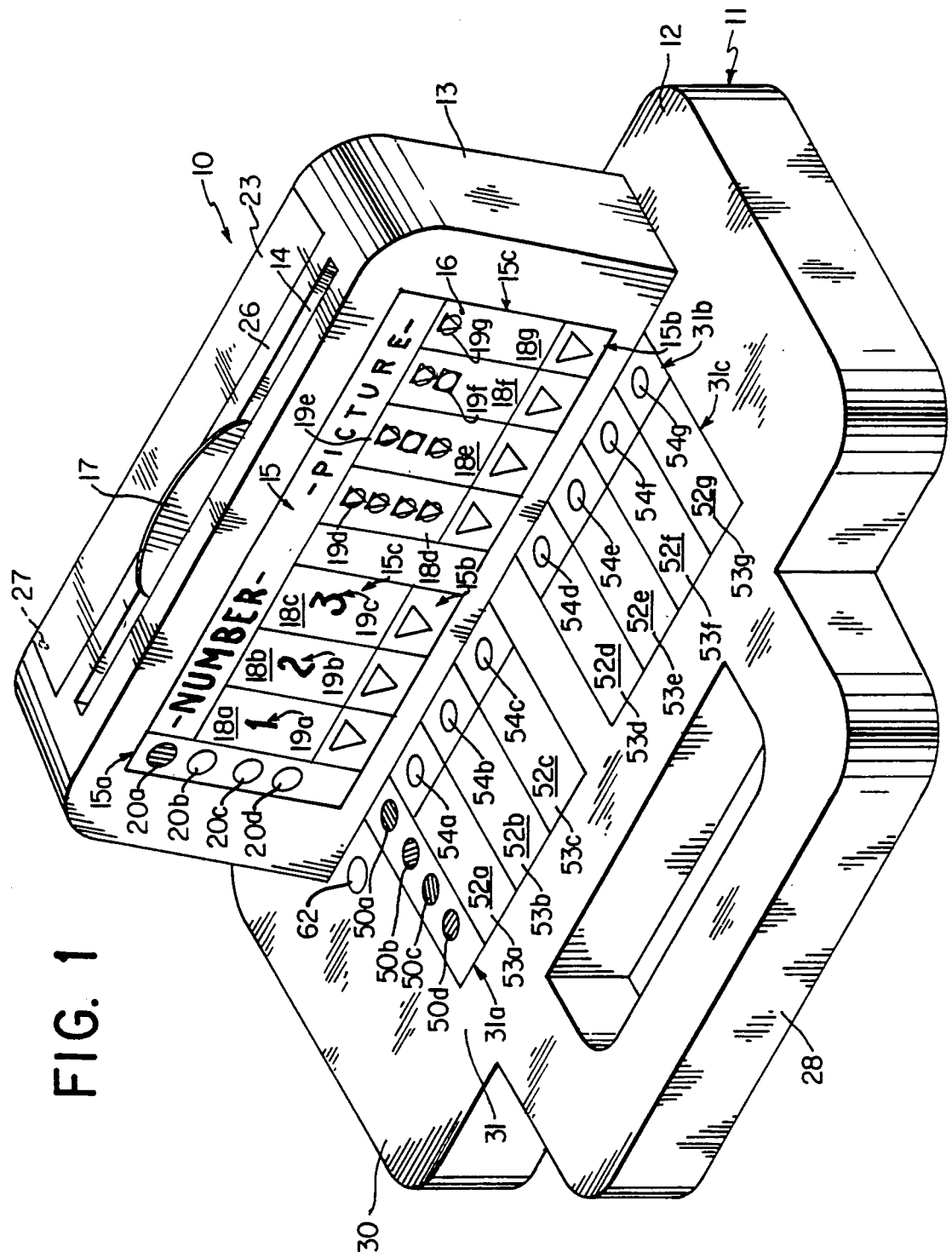
FIG. 1 is a schematic perspective view of a computer toy according to the invention.

Referring to the drawings, and initially to FIG. 1, a computer toy 10 is shown, for demonstrating logical relationships, such as to a child, e.g. of age 2½ to 6 years. Toy 10 is formed of a housing 11 shaped to resemble a personal computer and having a base portion or base 12 and a viewing portion or viewer 13 arranged to extend, e.g. angularly, upwardly from or above base 12 as a stationary portion fixed integrally thereto as shown, or alternatively as a movable portion hinged to base 12 to form a foldable or closable unit in the manner of a "laptop" type personal computer (not shown).

Viewer 13 has a top window slot 14 forming a front window display area 15 simulating a computer screen. Display means such as in the form of an interchangeable panel or card 16 having a top finger grip tab 17 is removably inserted via tab 17 in slot 14 in a manner simulating diskette insertion into a computer disk drive, thereby familiarizing the child with this basic step in computer operation (FIGS. 2-3). Alternatively, slot 14 may be a side slot and card 16 may have a side finger grip tab (not shown) for analogous sidewise card insertion.

Card 16 has a plurality of, e.g. seven, card positions 18a-g arranged in a selective, e.g. ordered, array linearly from left to right in a lower horizontal row 15b successively therealong, plus a display formed of a plurality of, e.g. three, first type symbols 19a-c, shown as numbers 1, 2 and 3, and a plurality of, e.g. four, second type symbols 19d-g, shown as pictures of 1, 2, 3 and 4 circles, in a like selective, e.g. ordered, array linearly from left to right in a horizontal row 15c successively along card 16, symbols 19a-g being above card positions 18a-g and in corresponding alignment therewith, for computer screen like viewing of symbols 19a-g on viewer 13.

It will be noted that each first type symbol 19a-c is logically related to only one among the second type symbols 19d-g to form an associated logically related pair.

Thus, first type symbol 19a represented by number 1 at card position 18a is only logically related to second type symbol 19g represented by the 1-circle picture at card position 18g, first type symbol 19b represented by number 2 at card position 18b is only logically related to second type symbol 19f represented by the 2-circle picture at card position 18f, and first type symbol 19c represented by number 3 at card position 18c is only logically related to second type symbol 19e represented by the 3-circle picture at card position 18e.

On the other hand, second type symbol 19d represented by the 4-circle picture at card position 18d is not logically related to any first type symbol.

While numbers 1, 2 and 3 forming first type symbols 19a, 19b and 19c are in logical numerical sequence at card positions 18a, 18b and 18c, respectively, the pictures of 1, 2, 3 and 4 circles forming second type symbols 19g, 19f, 19e and 19d are in inverse concordant sequence at card positions 18d, 18e, 18f and 18g, respectively. Use of these non-sequential symbol locations and relationships assures a random arrangement of second type symbols 19d-g relative to first type symbols 19a-c and a challenge to the user preventing pro forma ordinally successive selecting of logical symbol pairs.

Card 16 also has indicator means such as a plurality of, e.g. four, color coded dots 20a-d as code means to indicate a program mode for toy 10 that is correlated with the particular card 16. Dots 20a-d are arranged in a selective, e.g. ordered, array on the leftmost portion of card 16 in a vertical row 15a successively one below the other and to the left of the horizontal row 15c of symbols 19a-g, thereby simulating left margin software codes as might appear on a computer screen.

As shown, card 16 has a red dot 20a, and three white (i.e. blank) dots 20b-d, forming a binary digit "bit" type computer circuit program code, i.e. 1-0-0-0 where digit 1 is a given non-white color signifying an ON computer circuit switch position, and digit 0 is white or blank signifying an OFF computer circuit switch position. In turn, other interchangeable cards 16 may have a red or white dot 20a, a green or white dot 20b, a brown or white dot 20c and a blue or white dot 20d, to provide other combinations of at least one non-white color dot and at most three white (i.e. blank) dots. Thus, the code combination of a red dot 20a, a green dot 20b, a white dot 20c and a blue dot 20d forms the binary program mode 1-1-0-1.

This system of four coded dots 20a-d provides a sufficient number of possible combinations to indicate a corresponding number of as many as 16 different program modes for toy 10 which may be programmed by the child or other user as noted below, thereby familiarizing the user with this computer operation step.

Figure 4:
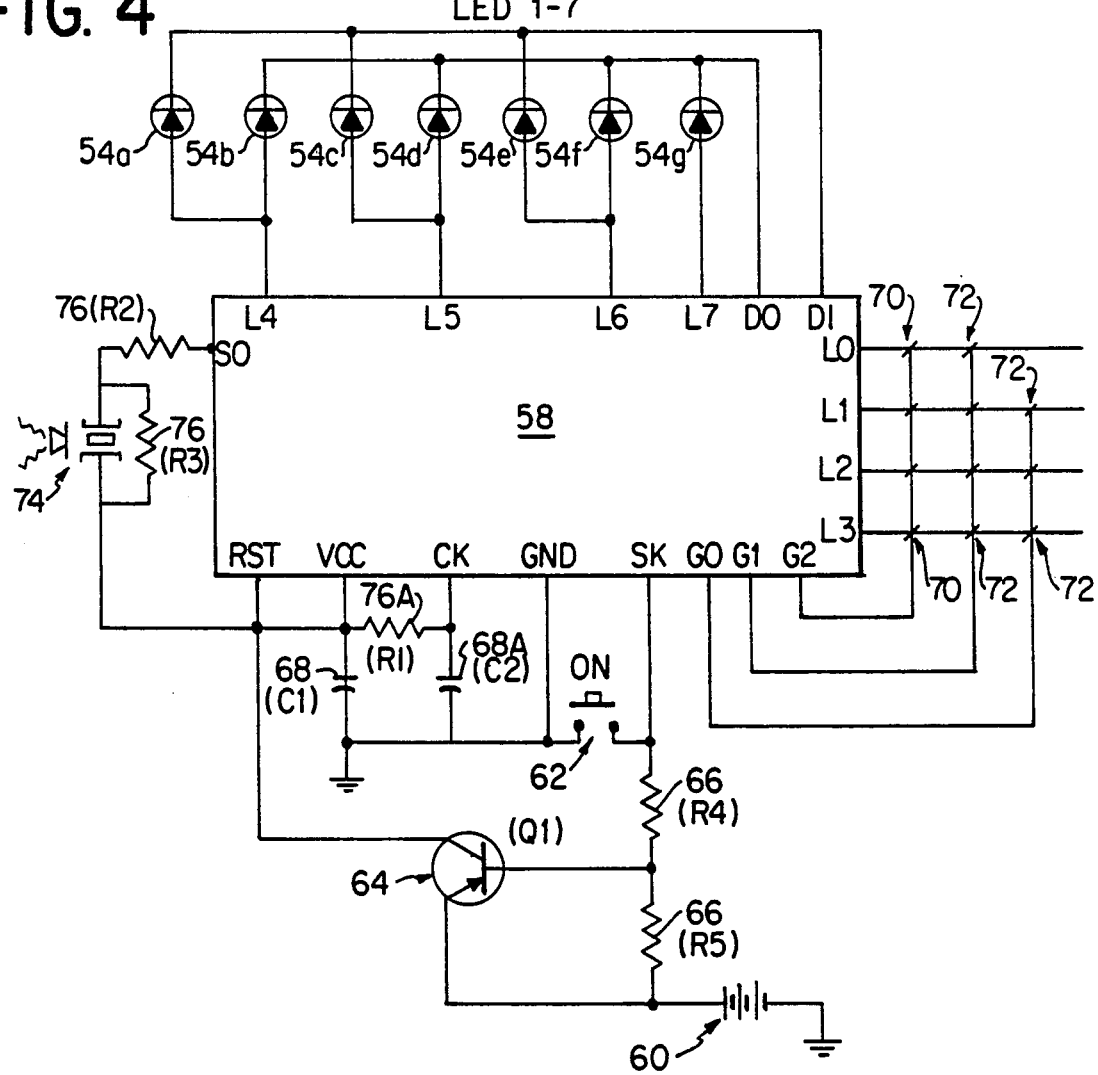
FIG. 4 is a schematic view of a printed circuit board containing components of the circuit used in the toy.

As shown in FIG. 3, housing 11 is desirably hollow and has a compartment 21 for storing a plurality of cards 16, each with a different array of symbols 19a-g corresponding to a different program mode, i.e. having a different code of dots 20a-d. Compartment 21 extends below the level of slot 14 in viewer 13 sufficiently into the interior 22 of housing 11 in base 12 to accommodate the tabs 17 of the stored cards 16 yet at a spaced location from the portion of interior 22 containing the logic circuit 56 for operating toy 10 as later described (FIG. 4).

Alternatively, if viewer 13 is provided as a hinged portion on base 12, the upright or height dimension of viewer 13 will be increased sufficiently to store cards 16, including their tabs 17, within compartment 21 without hindering hinged movement of viewer 13 or damaging the stored cards 16.

Compartment 21 is suitably closed by a cover 23, e.g. hinged at a hinge 24 to the rear wall 25 of viewer 13 and closing a cut-out portion of the top wall 26 of viewer 13 (FIG. 1), the adjacent cut-out edge of top wall 26 having a boss 27 or the like as a latch for frictionally engaging the adjacent side edge of cover 23 to keep it closed, but readily disengaged on applying slight manual pressure to open cover 23.

Housing 11 has a handle 28 at the front of base 12 to enable a child or other user to carry toy 10 in easy manner. Also, by forming the bottom wall 29 of base 12 as a generally flat wall, toy 10 may be readily positioned on a support such as a table or the lap of the child or other user in the same way as a "laptop" personal computer can be positioned.

As so positioned, the top wall 30 of base 12 provides a computer simulating keyboard area 31 (FIG. 1).

Control means such as a plurality of, e.g. four, mode switches 70 (FIG. 4) are used to program logic circuit 56 to the mode indicated by the corresponding plurality of, e.g. four, color coded dots 20a-d, in correlation therewith, on the particular card 16. Mode switches 70 are connected to circuit 56 for programming it to different modes, and are suitably formed with corresponding counterpart color coded finger operated keypads or mode keys 50a-d provided on base 12 at keyboard area 31 and color correlated with dots 20a-d.

Mode keys 50a-d are arranged in a selective, e.g. ordered, array on the leftmost portion of keyboard area 31 in a vertical row 31a successively one below the other as function keys just as on a typical computer keyboard, and in correlation with dots 20a-d include a red key 50a, a green key 50b, a brown key 50c and a blue key 50d. Where card 16, as shown, has a red dot 20a, and three white (i.e. blank) dots 20b-d, only mode key 50a is pressed to actuate its associated mode switch 70 (FIG. 4) to ON position to program circuit 56 per the aforesaid corresponding binary digit code, i.e. 1-0-0-0, mode keys 50b-d representing sequential inactive counterpart digits 0 to the white or blank dots 20b-d signifying OFF switch positions.

Of course, in addition to pressing "ON" main switch 62 on keyboard area 31 (FIG. 1), pressing one or more mode keys 50a-d in correlation with the particular color coding of dots 20a-d on a different card 16 will provide other program combinations, e.g. by pressing in top to bottom row sequence from none to at most four mode keys 50a-d. For example, for the sequential code combination of a red dot 20a, a green dot 20b, a white dot 20c and a blue dot 20d on a given card 16, mode key 50a will first be pressed, then mode key 50b, and finally mode key 50d, in sequence, while omitting to press mode key 50c, so as to program circuit 56 per the binary digit mode 1-1-0-1.

Including binary digit mode 0-0-0-0, which covers the "NONE" case where switch 62 is pressed "ON" but no mode key 50a-d is pressed to actuate its counterpart mode switch 70, and using as many as four mode switches 70 per the conjoint keys 50a-d in successive sequence, sixteen program mode combinations are possible:

None (0-0-0-0);
50a (1-0-0-0); 50b (0-1-0-0); 50c (0-0-1-0); 50d (0-0-0-1);
50a,50b (1-1-0-0); 50a,50c (1-0-1-0); 50a,50d (1-0-0-1);
50b,50c (0-1-1-0); 50b,50d (0-1-0-1);
50c,50d (0-0-1-1);
50a,50b,50c (1-1-1-0); 50a,50b,50d (1-1-0-1);
50a,50c,50d (1-0-1-1);
50b,50c,50d (0-1-1-1);
50a,50b,50c,50d (1-1-1-1);

This simple correlated system of coded dots 20a-d and mode keys 50a-d, in conjunction with switch 62, provides sufficient combinations to enable the child or other user to program circuit 56 easily by "entering" the code information per the set of color coded dots 20a-d on a particular card 16 in correlating sequence, as above described, via matching sequence pressing of the color code correlated mode keys 50a-d as function keys, while also becoming familiar with this computer operation step.

Housing 11 also has a plurality of, e.g. seven, housing positions 52a-g, e.g. on keyboard area 31 of base 12 to the right of the vertical row 31a of mode keys 50a-d, in a selective, e.g. ordered, array linearly from left to right in a lower or front horizontal row 31c and successively along keyboard area 31 in manner corresponding to the array of symbols 19a-g at card positions 18a-g on card 16, i.e. in correlation therewith, such that each housing position 52a-g is adjacent a respective symbol 19a-g.

Input means are provided such as a plurality of, e.g. seven, position switches 72 (FIG. 4), connected to circuit 56 to effect computer operations per the program mode selected by mode keys 50a-d, and suitably formed with corresponding counterpart finger operated keypads or position keys 53a-g at housing positions 52a-g in lower horizontal row 31c, plus associated light emitting means such as a like plurality of, e.g. seven, light emitting diodes (LEDs) or lights 54a-g in corresponding correlation to housing positions 52a-g.

Lights 54a-g are suitably arranged, e.g. to the right of the vertical row 31a of mode keys 50a-d, in a selective, e.g. ordered, array linearly from left to right in an upper or rear horizontal row 31b and successively along keyboard area 31 in manner corresponding to the array of symbols 19a-g at card positions 18a-g on card 16, such that each light 54a-g is in correlated adjacent alignment with a respective symbol 19a-g and its associated card position 18a-g on card 16 thereabove and also with a respective housing position 52a-g and its associated position key 53a-g therebelow.

Lights 54a-g are connected to circuit 56 to energize the particular light 54a-g associated with a particular housing position 52a-g upon pressing its particular key 53a-g to actuate the switch 72 corresponding to that housing position.

Position keys 53a-g and lights 54a-g thus serve in conjunction as input means to select or "enter" a particular housing position 52a-g by its associated position key 53a-g and position switch 72 and to indicate its selection by its associated light 54a-g and thereby its adjacent symbol 19a-g as one of a pair to be formed by such input means selecting.

In the preferred form shown in FIG. 1, keyboard area 31 has a left key section and a remaining key section to its right, with mode keys 50a-d arranged in vertical row 31a in the left key section, lights 54a-g arranged to the right of mode switch row 31a and in horizontal row 31b in the remaining key section, and position keys 53a-g also arranged to the right of mode key row 31a in horizontal row 31c in the remaining key section below light row 31b such that each position key 53a-g is adjacent its associated light 54a-g.

In turn, each card 16 is arranged on viewer 13 to provide a screen like display area 15 adjacent keyboard area 31 and having a left screen section and a remaining screen section to its right, with dots 20a-d corresponding to mode keys 50a-d arranged in vertical row 15a in the left screen section and adjacent mode key row 31a in keyboard area 31, and first type symbols 19a-c and second type symbols 19d-g arranged to the right of dot row 15a and in horizontal row 15c successively in the remaining screen section and adjacent light row 31b in keyboard area 31 such that each symbol 19a-g is adjacent a corresponding light 54a-g and associated position key 53a-g.

This left to right arrangement in toy 10 not only simulates the manner of operating a computer, with vertical rows of codes and keys resembling software screen codes and keyboard function keys, and horizontal rows of symbols and keys resembling screen displays and keyboard input keys, but also the normal order of left to right directional operations, thus serving as a self-teaching tool for familiarizing the novice with the orientation and typical operation of a computer as well as with the manner in which one learns to read.

These advantages are in addition to the main advantage of toy 10 in exposing the novice or other user to the concept of associated logical relationships, by operating a given position key 53a–c as "question key" for its associated first type symbol 19a–c as "question symbol", and in turn operating a given position key 53d–g as "answer key" for its associated second type symbol 19d–g as "answer symbol" in attempting to answer the selected question from among the possible answer choices, i.e. by related pairing of the question with its correct answer, per the information on the given card 16 after programming its code dots 20a–d by mode keys 50a–d.

Logic circuit 56 (FIG. 4) is used to detect whether a first type symbol 19a–c has been properly paired with a second type symbol 19d–g to form a logically related pair upon selecting, such as in sequence, a housing position 52a–c adjacent a first type symbol 19a–c and a housing position 52d–g adjacent a second type symbol 19d–g by position keys 53a–g and their associated switches 72 in circuit 56, as the case may be. Circuit 56 is also used to detect whether cumulatively all the logically related pairs have been sucessfully correctly formed from among the plurality of first type symbols 19a–c and second type symbols 19d–g on the given card 16.

Circuit 56 contains output means such as a sound generator or speaker 74 to issue a first or "reward" signal if a related pair has been formed, a different second or "penalty" signal if not so formed, and a still different third or "success" signal if all related pairs per the given card 16 have been cumulatively successfully correctly formed.

Thus, speaker 74 may generate one kind of sound as first signal, e.g. a pleasant musical tone or series of tones indicating successful symbol pairing, a different kind of sound as a second signal, e.g. an unpleasant buzzing "razzberry" sound indicating failure to pair related symbols, and a still different kind of sound as third signal, e.g. a different pleasant musical tone or series of tones indicating successful completion of all correct symbol pairing of the entire given card 16.

Desirably, lights 54d–g are also connected to circuit 56 so as to energize the particular light 54a–c indicating the selected first type symbol 19a–c and the particular light 54d–g indicating the selected second type symbol 19d–g forming the related pair therewith for flashing upon issuing the first or reward signal when a correct pairing of symbols has occurred by a correct answer choice using the input means position keys 53d–g, and also so as to energize the particular light 54d–g indicating the correct second type symbol 19d–g forming the related pair with the selected first type symbol 19a–c for flashing upon issuing the second or penalty signal when an incorrect pairing of symbols has occurred by an incorrect answer choice in using position keys 53d–g.

Advantageously, lights 54a–g are desirably further connected to circuit 56 so as to energize substantially simultaneously all lights 54a–g for common flashing upon issuing the third or success signal when the correct pairing of all related symbols has occurred by correct answer choices among second type symbols 19d–g to all three first type symbols 19a–c on the given card 16 using position keys 53d–g.

Thus, in the event that a correct answer to a question on a given card 16 has been selected upon "entering" the answer per a given second type symbol position key 53d–g, following the "entering" of a question per a given first type symbol key 53a–c correlated therewith as a logically related pair, the selected question light 54a–c flashes at the same time as the corresponding answer light 54d–g. Concurrently, the first "reward" signal is played, given both visual and aural confidence building feedback to the child or other user regarding the correct question and answer association.

When all three answers on the card 16 have been correctly selected and "entered", all seven lights 54a–g flash together. Concurrently, the third "success" signal is played, giving both visual and aural accomplishment satisfying feedback to the child or other user that the card 16 has been successfully completed in its entirety.

On the other hand, upon "entering" an incorrect answer, the simultaneous occurrence of instructive light and "penalty" sound serves to indicate aurally to the child or other user the fact that an incorrect answer has been selected, while also visually indicating the correct answer, thus immediately teaching such user the proper answer to the question.

As shown in FIG. 4, logic circuit 56 is of conventional, programmable type, including a microprocessor or logic chip 58 (e.g. commercially available under the designation National Semiconductor Corp. COPS-411L) to which the four mode switches 70 and seven position switches 72 (S1-S11) are connected at locations LO-L4 in a particular pattern.

Specifically, the four mode switches 70 (per mode keys) 50a–d) in an inner mode circuit are separately connected at location G2, four of the position switches 72 (per second type symbol or answer keys 53d–g) in a middle second type symbol or answer circuit are separately connected at location G1, and the remaining three position switches 72 (per first type symbol or question keys 53a–c) in an outer first type symbol or question circuit are separately connected at location G2.

It is seen that each mode switch 70 (per keys 50a–d) is associated with a respective one of the four second symbol or answer switches 72 (per keys 53d–g), whereas each of the three first symbol or question switches (per keys 53a–c) is associated with a respective one of only three of the mode switch-answer switch combinations, such that the fourth mode switch-answer switch combination is non-functional.

Based on the program mode, mode switches 70 may be programmed to assign locations L1, L2 and L3 in a given sequential order among position keys 53a–c) corresponding to first type symbols 19a–c, in specific individual combination with three of the four position keys 53d–g corresponding to second type symbols 19d–g in correlation corresponding to three successively selected logically related pairs, such that location LO is assigned to the omitted position key corresponding to the second type symbol which by definition is not logically related to any first type symbol.

In effect, mode switches 70 (keys 50a–d) tell the microprocessor or logic chip 58 which card 16 is inserted in slot 14 per its coded dots 20a-d, and which question-answer or game routine is to be played, as mode switches 70 establish the different functions of, and the relationships between, the first type symbol or question selecting position switches 72 (keys 53a-c) and the second type symbol or answer selecting position switches 72 (keys 53d-g), each "entered" code combination fixing the relationship between each question and answer switch pair in correlation with the dots 20a-d of that card 16.

In correlation with such switch arrangement, lights 54a-g (LEDs 1-7) are connected in conventional manner to microprocessor or logic chip 58 at locations L4, L5, L6, L7, D0 and D1, as the case may be.

Circuit 56 is energized by power supply 60 of any suitable type, e.g. a battery of four "AA" or 1.5 volt dry cells, upon actuating main "ON" switch 62 (on keyboard area 31 in FIG. 1), or alternatively by suitable conventional arrangement of circuit 56 upon initially actuating any of mode switches 70 (per keys 50a-d) so that circuit 56 remains energized for a set period, e.g. 1-3 minutes, by a suitable timing function, programmed within microprocessor or logic chip 58, before automatically shutting off (to save the battery power supply), or until the set period of automatically restarted by continued use of any switch 70 or 72 (per any key 50a-d or 53a-g).

Circuit 56 contains a power circuit including an electronic switch element such as a transistor 64 (Q1) and associated resistors 66 (R4, R5), plus capacitor 68 (C1, e.g. 1 uF rated), an oscillator circuit consisting of capacitor 68A (C2, e.g. 100 pF rated) and resistor 76A (R1), as well as a sound circuit containing resistors 76 (R2, R3) and a sound generator or speaker 74, conventionally connected at locations SK, GND, CK, VCC, RST and SO.

Circuit 56 may be arranged so that speaker 74 not only issues a "reward", "penalty" or "success" sound signal in the appropriate case, but also issues a further different sound when switch 62 turns on toy 10, and each time a key 53a-c or 53d-g is actuated, as the case may be.

Also, circuit 56 may be arranged in a "scan" mode prompting the user to select the question desired to be answered first, by scanning the three question lights 54a-c, so that once a selection is made per one key 53a-c and its answer given per one key 53d-g, the next sequential light 54a-c is energized to prompt selection per its associated key 53a-c.

In a preferred form of operation, pressing "ON" switch 62, or actuating any mode key 50a-d, turns on toy 10 and causes speaker 74 to play a series of seven musical "hello" notes while each of the lights 54a-g is correspondingly sequentially energized. Thus, when no mode key is pressed, after turning "ON" toy 10 by switch 62, a valid mode, NONE=0-0-0-0, is entered, i.e. an automatic song player mode ("hello song"). Once turned on, actuating any of keys 53a-g causes its associated musical note to be played for a set period, e.g. 100 ms. This may also occur where the program mode automatically selects the next question by energizing its associated light 54a-c, i.e. while also playing its associated musical note. If no switch is actuated for a set period, e.g. 1-3 minutes, a "goodbye" sound and light sequence occurs and toy 10 automatically turns off.

Housing 11 and its variou parts, plus cards 16, may be made of suitable structural plastic, cardboard, wood and/or metal, as the case may be, whereas circuit 56 must be made of conductive electronic components having appropriate conventional insulation, all of which are commercially available.

Instead of light emitting diodes 54a-g, other suitable selection input signal means may be used, e.g. electric lamps (bulbs) or the like, and instead of speaker 74 other suitable output response signals means may be used, e.g. a different type sound generator issuing different kinds of sound or a light emitter issuing different kinds of light, or the like.

Of course, lights 54a-g need not be on base 12, but can instead be on viewer 13, e.g. in window display area 15 in correlated adjacency with symbols 19a-g. Thus, cards 16 may be provided of transparent or translucent, e.g. plastic, materil having symbols 19a-g thereon, e.g. in lightly colored or translucent form, and lights 54a-g may be located in window display area 15 such that a given card 16, when inserted in slot 14, is in front of lights 54a-g, enabling their emitted light to shine as localized background light through the card 16.

In this case, housing positions 52a-g will be located in corresponding associated relation to lights 54a-g in window display area 15 of viewer 13, while keys 53a-g will remain on base 12, e.g. in their original correlated positions in associated successive sequential alignment with the conjoint positions on viewer 13 of housing positions 52a-g and lights 54a-g, and on card 16 of card positions 18a-g and symbols 19a-g.

Similarly, mode keys 50a-d need not be in a vertical row on base 12, but instead may be in a horizontal row, e.g. along the upper or rear part of base 12, and in the same way dots 20a-d may instead be in a horizontal row on the given card 16, e.g. along the lower part of card 16 correspondingly adjacent the horizontal row of mode keys 50a-d. Also, while a series of four code dots 20a-d and mode keys 50a-d are present in the embodiment shown, a lower or higher number of code dots and mode keys may be used for other ranges of programming combinations for circuit 56 with a correlating set of cards 16.

It will be understood that first type symbols 19a-c and second type symbols 19d-g may have any desired symbolic form and associative relationship content or subject matter. Also, the number of first type symbols and of second type symbols may also be varied, as desired, so long as at least one first type symbol and at least two alternative choice second type symbols are provided, in which case the number of corresponding associated card positions, housing positions, position switches and their position keys, and lights will concordantly vary.

Hence, toy 10 is effective, especially in the case of a small child, e.g. of age 2½ to 6, to demonstrate logical relationships, and in practical and rudimentary way computer operations and linear left to right reading operations, yet is simple, inexpensive and relatively small in construction and robust and serviceable in use, composed of conventional materials and circuit components, minimum in number, while being easily hand carried and operated even by a small child.

Of course, toy 10 may be programmed to perform other operations such as the playing of various games following usual routines of pressing keys 53a-g individually or in a given order to obtain responses as steps in the game, the playing of various tunes by pressing one or more keys 53a-g, and the like.

It will be appreciated that the foregoing specification and accompanying drawings are set forth by way of illustration and not limitation of the present invention, and that various modifications and changes may be made therein without departing from the spirit and scope of the present invention which is to be limited solely by the scope of the appended claims.

What is claimed is:

1. Computer toy for demonstrating logical relationships to a child, comprising:
   a housing shaped to resemble a personal computer and having a keyboard base portion and a viewing portion simulating a computer screen arranged to extend upwardly from the base portion,
   display means including an interchangeable panel removably arranged on the simulated computer screen viewing portion of the housing, having a plurality of first type symbols and a plurality of second type symbols in an array to be displayed on the viewing portion, each first type symbol being logically related to one among the second type symbols to form a related pair, and indicator means having code means to indicate a program mode correlating a logic circuit and display means for forming such related pairs,
   a plurality housing positions in an array on the housing corresponding to the array of the plurality of first and second symbols such that each housing position is adjacent a respective one of the plurality of the first and second symbols,
   input means including a plurality of position switches on the keyboard base portion of the housing cooperating with the plurality of housing positions, the plurality of position switches being are actuatable to select particular housing positions, and a light emitting means corresponding to and associated with each of the housing positions,
   the logic circuit detects whether a first type symbol has been properly paired with a second type symbol to form a related pair upon input selection of a housing position adjacent a first type symbol and a housing position adjacent a second type symbol,
   output means coupled to the circuit to issue a first signal if a properly related pair has been formed and a different second signal if not so formed, and
   control means including a plurality of mode switches on the keyboard base portion connected to program the circuit to different program modes corresponding to the indicated program mode on the panel,
   wherein the input means is connected to the circuit so that the particular light emitting means associated with a particular housing position is energized upon position switch actuation to select that housing position.

2. Toy of claim 1 wherein the circuit is arranged to detect whether such a properly related pair has been formed upon input selection in sequence of a housing position adjacent a first type symbol and a housing position adjacent a second type symbol.

3. Toy of claim 1 wherein the viewing portion has a window slot for removably inserting the panel therein.

4. Toy of claim 1 wherein the housing has a compartment for storing a plurality of said panels, each with a different symbol array corresponding to a different program mode.

5. Toy of claim 1 wherein the mode switches include finger operated keypads on the base portion.

6. Toy of claim 1 wherein the circuit responds to the first signal from the output means energizes a particular light emitting means for indicating a correct pairing of symbols has occured.

7. Toy of claim 1 wherein the circuit responds to the second signal from the output means energizes a particular light emitting means for indicating an incorrect pairing of symbols has occurred.

8. Toy of claim 1 wherein the output means includes a sound generator to generate one kind of sound as the first signal and a different kind of sound as the second signal.

9. Toy of claim 1 wherein the circuit is arranged to detect whether cumulatively all the related pairs have been successfully formed from among the plurality of symbols, and the output means is arranged to issue a still different third signal when the correct pairing of all related symbols has occurred.

10. Toy of claim 9 wherein the output means includes a sound generator to generate one kind of sound as the first signal, a different kind of sound as the second signal and a still different kind of sound as the third signal.

11. Toy of claim 10 wherein the circuit energizes substantially simultaneously all of the light emitting means when the third signal is issued.

12. Toy of claim 10 wherein the circuit energizes a particular light emitting means when the first signal is issued for indicating a correct pairing of symbols has occurred, energizes another particular light emitting means when the second signal is issued for indicating an incorrect pairing of symbols has occurred, and energizes substantially simultaneously all of the light emitting means when the third signal is issued for indicating the correct pairing of all related symbols has occurred.

13. Toy of claim 1 wherein the keyboard base portion having a left key section and a remaining key section to the right thereof, the mode switches are arranged in a generally vertical row in the left key section, the light emitting means are arranged to the right of the mode switch row and in a generally horizontal row in the remaining key section, and the position switches are arranged to the right of the mode switch row and in a generally horizontal row in the remaining key section below the light emitting means row such that each position switch is associated with and adjacent a corresponding light emitting means.

14. Toy of claim 13 wherein the panel is arranged on the simulated computer screen viewing portion to provide a screen like display area adjacent the keyboard area and having a left screen section and a remaining screen section to the right thereof, the code means includes a plurality of code indicators corresponding to the mode switches and arranged in a generally vertical row in the left screen section and adjacent the mode switch row in the keyboard area, and the first type symbols and second type symbols are arranged to the right of the code indicator row and is a generally horizontal row successively in the remaining screen section and adjacent the light emitting means row in the keyboard area such that each symbol is adjacent a corresponding light emitting means and its associated position switch.

* * * * *